G. C. BECK.
VALVE MECHANISM.
APPLICATION FILED FEB. 10, 1910.

1,027,977.

Patented May 28, 1912.
3 SHEETS—SHEET 1.

WITNESSES
A. C. Schmidt
J. S. Keely

INVENTOR
George C. Beck
BY
Max A. Schmidt
ATTORNEY

G. C. BECK.
VALVE MECHANISM.
APPLICATION FILED FEB. 10, 1910.

1,027,977.

Patented May 28, 1912.
3 SHEETS—SHEET 2.

WITNESSES
A. E. Schmidt.
J. S. Keely

INVENTOR
George C. Beck
BY
May A. Schmidt
ATTORNEY

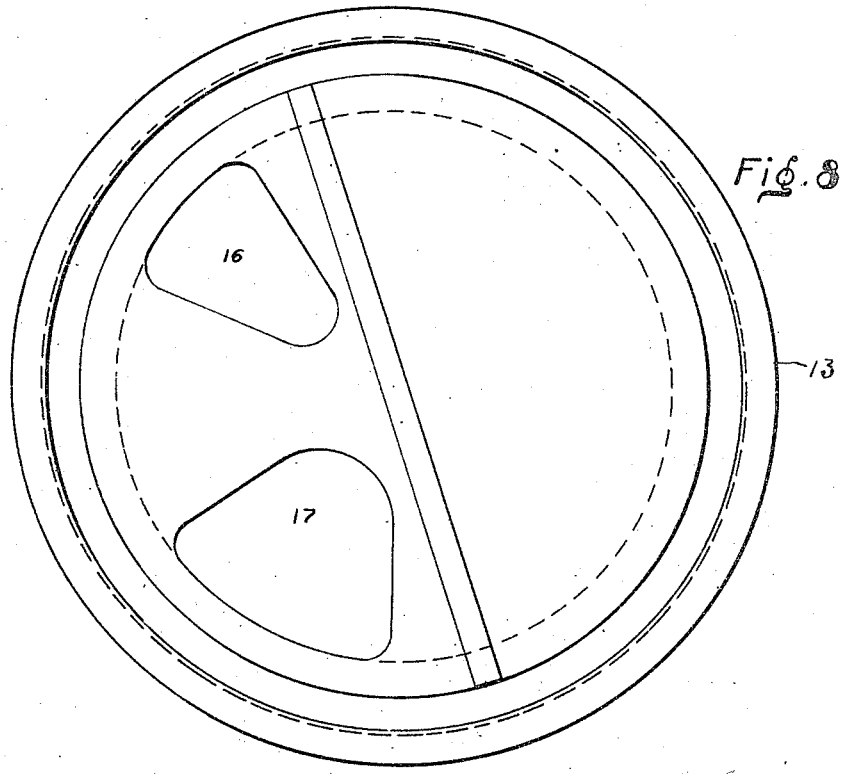

UNITED STATES PATENT OFFICE.

GEORGE C. BECK, OF SPOKANE, WASHINGTON, ASSIGNOR OF ONE-HALF TO EUGENE P. BATZEL, OF DETROIT, MICHIGAN.

VALVE-MECHANISM.

1,027,977.  Specification of Letters Patent.  Patented May 28, 1912.

Application filed February 10, 1910. Serial No. 543,160.

*To all whom it may concern:*

Be it known that I, GEORGE C. BECK, a citizen of the United States, residing at Spokane, in the county of Spokane and State of Washington, have invented certain new and useful Improvements in Valve Mechanism, of which the following is a specification.

This invention is a valve mechanism designed more particularly for internal-combustion engines, the object of the invention being to provide a valve which is non-corrodible, water-cooled, self-lubricating and noiseless, and to this end, it consists in a novel construction and arrangement of parts to be hereinafter described and claimed.

In order that the invention may be fully understood, reference is had to the accompanying drawings, in which—

Figures 1, 2:
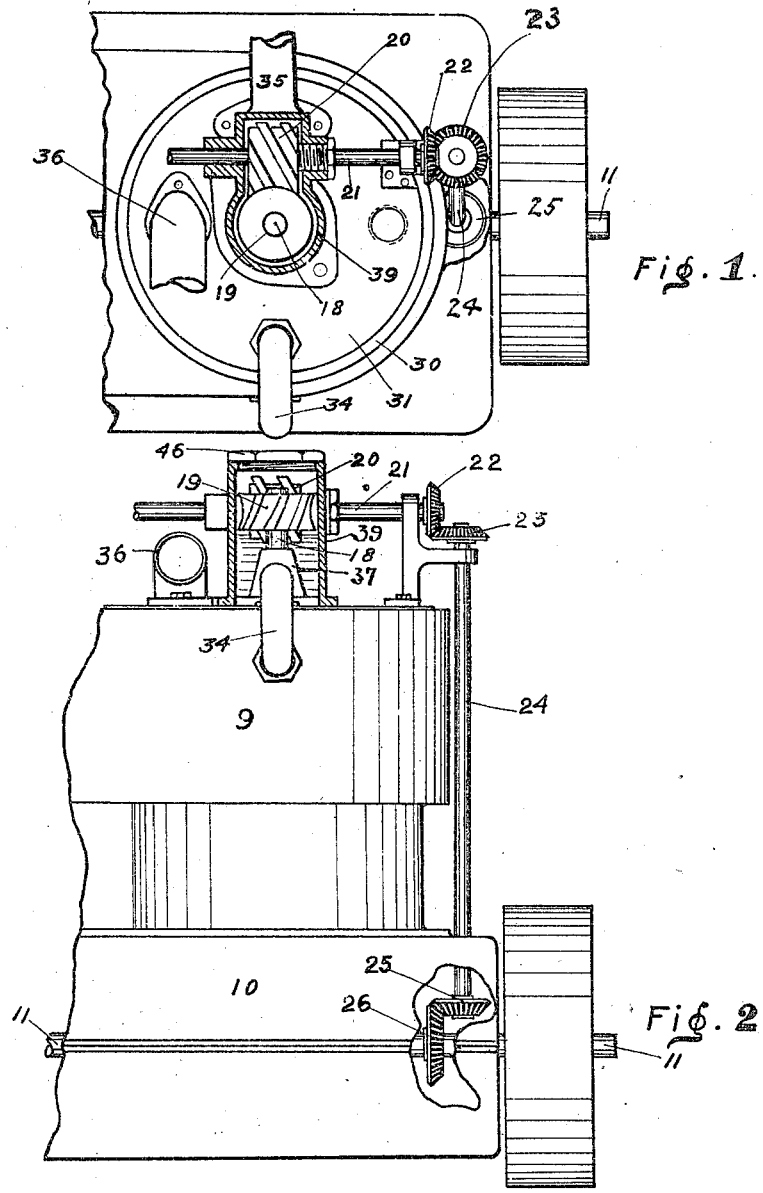
Figure 3:
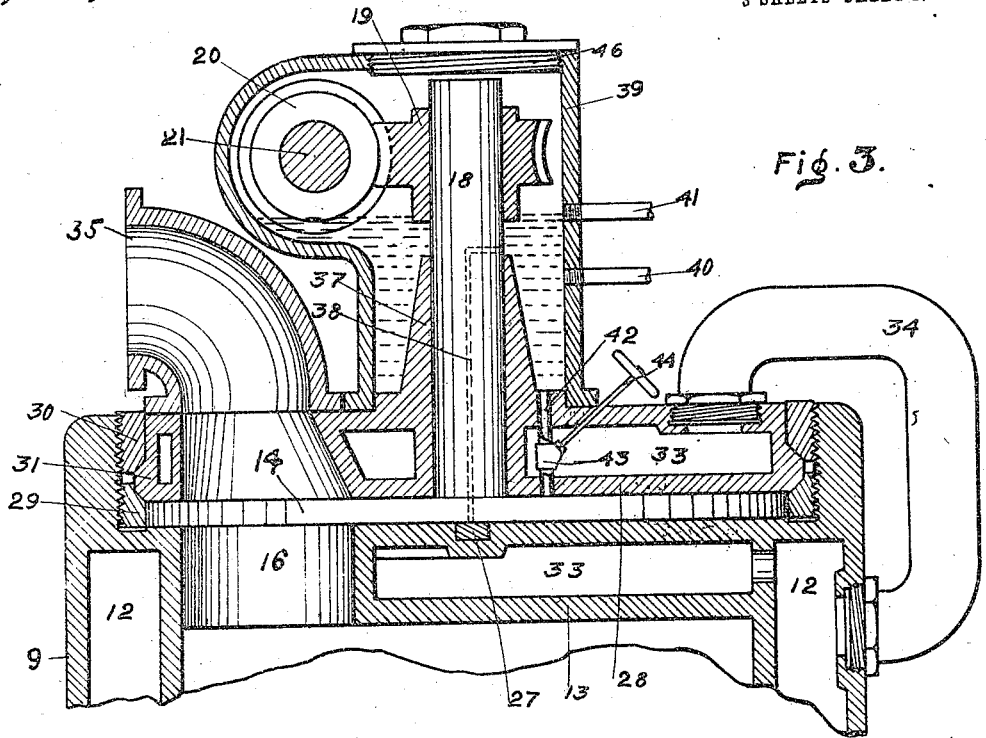
Figure 4:
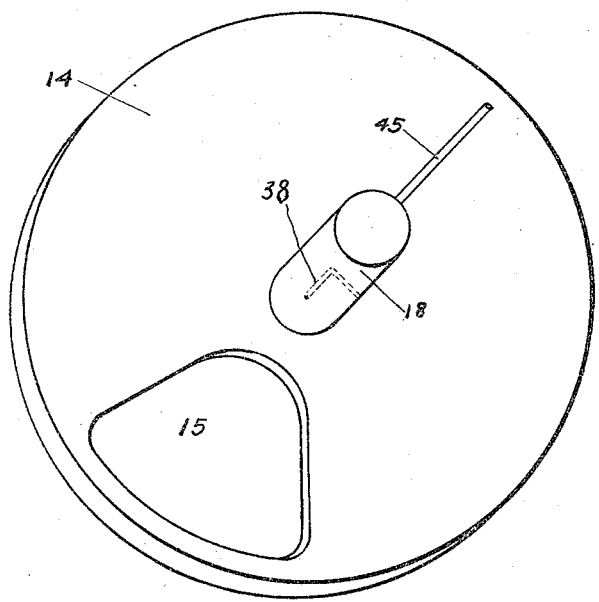

Figure 1 is a plan view of the engine, and Fig. 2 an elevation, partly broken away, showing a portion of the valve mechanism. Fig. 3 is an enlarged section of the valve mechanism. Fig. 4 is a perspective view of the valve. Figs. 5 and 6 are edge views, partly broken away, of the valve retaining rings hereinafter referred to. Fig. 7 is an edge view of a packing strip employed in connection with the valve. Fig. 8 is a plan view of the cylinder head with all parts of the valve mechanism removed therefrom.

Referring specifically to the drawings, 9 denotes the cylinder of the engine which is supported on a base 10 having bearings for the crank shaft 11. The cylinder has the usual water jacket 12.

In the cylinder head 13 is made a circular recess to receive the valve 14 and its associate parts. The valve is a disk having a port 15 which is adapted to alternately register with inlet and exhaust ports 16 and 17, respectively, formed in the cylinder head. This operation is effected by rotating the disk. There is shown a stem 18 rising from the top of the disk, and fitted with a spiral gear 19 which is in mesh with a spiral gear 20 on a shaft 21, provided with a bevel gear 22 meshing with a bevel gear 23 on one end of a shaft 24, the other end of said shaft carrying a bevel gear 25 which is in mesh with a bevel gear 26 on the crank shaft 11. This gearing imparts a rotary motion to the valve disk when the engine is in motion. The engine belongs to the four-cycle type of internal combustion engines, in view of which the gearing will have a ratio of two to one, in order to effect the operation of the valve at the proper time, the valve making one complete revolution to two revolutions of the crank shaft.

The valve disk 14 seats on the floor of the recess in the cylinder head 13, and in said floor is a diametrical groove which holds a packing strip 27, said strip being forced against the bottom of the valve disk by springs $27^a$. The top of the valve disk is engaged by a false head 28 which is mounted in the recess of the cylinder head. The diameters of the valve disk and the false head are less than the diameter of the recess which leaves a space between said parts and the wall of the recess to receive two retaining rings 29 and 30, respectively. These rings screw into the recess, their outer edges being threaded to match threads in the wall of the recess. The ring 29 encircles the valve disk and the ring 30 encircles the false head.

On the periphery of the false head, adjacent to the valve disk, is an annular shoulder 31, the bottom portion of which is engaged by the ring 29 and the top portion by the ring 30 whereby the false head is securely held in place, and as the valve disk is located between the false head and the cylinder head, the valve is also held in place, and may be adjusted to run tight or loose. Those portions of the shoulder 31 which are engaged by the rings are beveled as clearly shown in Fig. 3, and the contiguous inner edges of the rings are beveled to match. The rings 29 and 30 are set by means of a spanner wrench or similar tool, they being formed with notches 32 to provide a hold for said tool.

The cylinder head and the false head are both chambered as indicated at 33, to receive a cooling medium in view of which the valve disk will be cooled on both sides. A pipe 34 carries water from the jacket 12 into the chamber of the false head. The false head also has ports which are in alinement with the ports 16 and 17, the intake pipe 35 being connected to the port of the false head which is in alinement with the port 16, and the exhaust pipe 36 being connected to the other port of the false head.

The top of the false head is formed with a bearing stud 37 in which the valve stem 18 works, and the false head also has an opening through which the valve stem passes.

The following means are provided for lubricating the valve disk: In the valve stem 18 is an axial duct 38 which opens at one end through the bottom of the valve disk, and at its opposite end through the side of the valve stem, above the stud 37. The stud and the valve stem, as well as the gears 19 and 20, are inclosed in a housing 39 mounted on the false head. This housing serves as a reservoir for a supply of lubricant, which is carried into the housing by a pipe 40 leading to a pump. An overflow pipe 41 back to the lubricant tank is also provided. The lubricant in the housing enters the duct 38 and is carried to the bottom of the valve disk. The top of the valve disk is also lubricated, a pipe 42, extending through the false head from the housing, being provided for this purpose, said pipe carrying the lubricant to the top of the valve disk. In this pipe is interposed a valve 43, said valve being located in that portion of the pipe which passes through the water chamber of the false head. The valve has an operating stem 44 extending to the outside of the false head, through the top thereof. The top of the valve disk also has a radial groove 45 which distributes the lubricant over the entire surface of the top of the valve disk. The housing 39 has bearings for supporting the shaft 21, and in the top of the housing is an opening to permit access to the parts in the housing, said opening being provided with a suitable closure which may be a screw plug 46 as shown. The spiral gears in the housing are also lubricated by the lubricant therein.

By the arrangements of parts herein described, the valve is kept properly lubricated, and as it is also cooled on both sides corrosion is effectually prevented.

I claim:

1. The combination with an engine cylinder having a recess provided with ports; of a valve mounted in the recess over the ports, said valve comprising a rotary disk having a port controlling the aforesaid ports, a false head mounted in the recess on the valve disk, said false head and valve disk having a diameter which is less than the diameter of the recess, an annular shoulder on the false head, and rings seating in the recess, said rings encircling the false head and the valve disk, and engaging the shoulder of the false head.

2. The combination with an engine cylinder having a recess provided with ports, of a valve mounted in the recess over the ports, said valve comprising a rotary disk having a port controlling the aforesaid ports, a false head mounted in the recess on the valve disk, said false head and valve disk having a diameter which is less than the diameter of the recess, an annular shoulder on the false head, and rings seating in the recess, said rings encircling the false head and the valve disk, and engaging the shoulder of the false head, the contiguous surfaces of the rings and shoulder being beveled.

3. The combination with an engine cylinder having a port, of a valve mounted over the port, said valve comprising a rotatable ported disk, an operating stem on the valve disk, said stem having an axial duct opening at one end through the bottom of the valve disk, and at its other end through the side of the stem, a retaining member for the valve disk, through which member the valve stem passes, and a lubricant container mounted on the retaining member, the last mentioned end of the aforesaid duct opening above the retaining member into the lubricant container.

4. The combination with an engine cylinder having a port, of a valve mounted over the port, said valve comprising a rotatable ported disk, a retaining member for the valve disk, a lubricant container mounted on the retaining member, and conduits extending from the container to opposite sides of the valve.

In testimony whereof I affix my signature in presence of two witnesses.

GEORGE C. BECK.

Witnesses:
H. E. SMITH,
NETTIE KING.